US012465502B2

(12) United States Patent
Lenzi et al.

(10) Patent No.: US 12,465,502 B2
(45) Date of Patent: Nov. 11, 2025

(54) VOLITIONAL EMG CONTROLLER FOR A POWERED KNEE PROSTHESIS

(71) Applicant: University of Utah Research Foundation, Salt Lake City, UT (US)

(72) Inventors: Tommaso Lenzi, Salt Lake City, UT (US); Suzi Creveling, Salt Lake City, UT (US); Lukas R. Gabert, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 18/898,303

(22) Filed: Sep. 26, 2024

(65) Prior Publication Data

US 2025/0107908 A1    Apr. 3, 2025

Related U.S. Application Data

(60) Provisional application No. 63/541,694, filed on Sep. 29, 2023.

(51) Int. Cl.
*A61F 2/72* (2006.01)
*A61F 2/64* (2006.01)
(Continued)

(52) U.S. Cl.
CPC ............... *A61F 2/72* (2013.01); *A61F 2/64* (2013.01); *A61F 2002/5003* (2013.01);
(Continued)

(58) Field of Classification Search
None
See application file for complete search history.

(56) References Cited

U.S. PATENT DOCUMENTS 8,623,098 B2    1/2014    Goldfarb et al.
8,652,218 B2    2/2014    Goldfarb et al.
(Continued)

FOREIGN PATENT DOCUMENTS

CA    2762265 A1    10/2001
CN    114795604 A    7/2022
(Continued)

OTHER PUBLICATIONS

Alcock L., et al., "Biomechanical demands of the 2-step transitional gait cycles linking level gait and stair descent gait in older women," Journal of biomechanics, vol. 48, Issue 16, 2015, pp. 4191-4197.
(Continued)

*Primary Examiner* — David H Willse
(74) *Attorney, Agent, or Firm* — Workman Nydegger

(57) ABSTRACT

Disclosed are prosthetic systems comprising a powered knee upper leg prosthesis and a volitional controller configured to provide control of the prosthesis to the user. The prosthetic system may be configured to enable a user to climb a set of stairs. The prosthetic system may be activated by the activation of an EMG signal source, such as the biceps femoris muscle of the upper leg. The volitional controller of the prosthetic system may be further configured to receive a ground state signal and/or an IMU signal to determine a target knee torque for operating the powered knee of the prosthesis.

17 Claims, 12 Drawing Sheets

(51) Int. Cl.
*A61F 2/70* (2006.01)
*A61F 2/50* (2006.01)
*A61F 2/76* (2006.01)

(52) U.S. Cl.
CPC ... *A61F 2002/701* (2013.01); *A61F 2002/704* (2013.01); *A61F 2002/7625* (2013.01); *A61F 2002/7635* (2013.01); *A61F 2002/7645* (2013.01)

(56) References Cited

U.S. PATENT DOCUMENTS

| | | |
|---|---|---|
| 8,696,764 B2 | 4/2014 | Hansen et al. |
| 8,852,292 B2 | 10/2014 | Ragnarsdottir et al. |
| 9,192,487 B2 | 11/2015 | Flaven et al. |
| 9,221,177 B2 | 12/2015 | Herr et al. |
| 9,248,031 B2 | 2/2016 | Pusch et al. |
| 9,443,203 B2 | 9/2016 | Young et al. |
| 9,649,207 B2 | 5/2017 | Hahn et al. |
| 9,687,377 B2 | 6/2017 | Han et al. |
| 9,763,809 B2 | 9/2017 | Palmer et al. |
| 9,975,249 B2 | 5/2018 | Herr et al. |
| 10,369,023 B2 | 8/2019 | Simon et al. |
| 10,575,971 B2 | 3/2020 | Herr et al. |
| 2002/0052663 A1 | 5/2002 | Herr et al. |
| 2004/0167641 A1 | 8/2004 | Kawai et al. |
| 2009/0265018 A1 | 10/2009 | Goldfarb et al. |
| 2010/0241242 A1 | 9/2010 | Herr et al. |
| 2012/0004736 A1 | 1/2012 | Goldfarb et al. |
| 2012/0221120 A1 | 8/2012 | Seyr et al. |
| 2012/0226364 A1 | 9/2012 | Kampas et al. |
| 2013/0310949 A1 | 11/2013 | Goldfarb et al. |
| 2014/0364962 A1 | 12/2014 | Gregg et al. |
| 2015/0066156 A1 | 3/2015 | Geyer et al. |
| 2015/0127119 A1 | 5/2015 | Simon et al. |
| 2015/0182354 A1 | 7/2015 | Bonnet et al. |
| 2016/0058582 A1 | 3/2016 | Lenzi et al. |
| 2016/0302686 A1 | 10/2016 | Sigurpórsson et al. |
| 2016/0338857 A1 | 11/2016 | Herr et al. |
| 2017/0354529 A1 | 12/2017 | Han et al. |
| 2019/0388247 A1 | 12/2019 | Goldfarb et al. |
| 2023/0270570 A1 | 8/2023 | Hofmann et al. |
| 2025/0107905 A1 | 4/2025 | Lenzi et al. |
| 2025/0107907 A1 | 4/2025 | Lenzi et al. |

FOREIGN PATENT DOCUMENTS

| | | | |
|---|---|---|---|
| EP | 2849687 B1 | 7/2018 | |
| WO | 2013/067407 A1 | 5/2013 | |
| WO | 2016/130745 A1 | 8/2016 | |
| WO | 2022/087161 A1 | 4/2022 | |
| WO | WO 2022/087160 A1 * | 4/2022 | .............. A61F 2/72 |

OTHER PUBLICATIONS

Au S. et al., "Powered ankle-foot prosthesis to assist level-ground and stair-descent gaits," Neural Networks, vol. 21, Issue 4, 2008, pp. 654-666.
Best T. K. et al., "Data-Driven Variable Impedance Control of a Powered Knee-Ankle Prosthesis for Adaptive Speed and Incline Walking", IEEE Transactions on Robotics, 2023, pp. 19.
Ha K. H. et al., "Myoelectric control of a powered knee prosthesis for volitional movement during non-weight-bearing activities", 32nd Annual International Conference of the IEEE EMBS., 2010, pp. 3515-3518.
Hood S. et al., "Powered Knee and Ankle Prosthesis with Adaptive Control Enables Climbing Stairs with Different Stair Heights, Cadences, and Gait Patterns", IEEE Trans Robot, vol. 38, Issue 3, Jun. 2022, pp. 1430-1441.
Huang H. et al., "A strategy for identifying locomotion modes using surface electromyography," IEEE Trans Biomed Eng, vol. 56, Issue 1, Jan. 2009, pp. 65-73.
Neuman R. M., et al., "There are unique kinematics during locomotor transitions between level ground and stair ambulation that persist with increasing stair grade," Scientific Reports, vol. 13, Issue 1, 2023, 8576, pp. 11.
Non-Final Office Action received for U.S. Appl. No. 18/898,315, mailed on Nov. 14, 2024, 29 pages.
Non-Final Office Action received for U.S. Appl. No. 18/898,320, mailed on Nov. 20, 2024, 20 pages.
Peng J., et al., "Anticipatory kinematics and muscle activity preceding transitions from level-ground walking to stair ascent and descent," Journal of biomechanics vol. 49, Issue 4, 2016, pp. 528-536.
Shultz, A. H. et al., "Variable cadence walking and ground adaptive standing with a powered ankle prosthesis," IEEE Trans Neural Syst Rehabil Eng., vol. 24, Issue 4, Apr. 2016, pp. 495-505.
Examiner Interview Summary Record Action received for U.S. Appl. No. 18/898,320, mailed on Mar. 13, 2025, 1 page.
Non-Final Office Action received for U.S. Appl. No. 18/898,315, mailed on Mar. 19, 2025, 31 pages.
Translation of originally published on May 19, 2011.

* cited by examiner

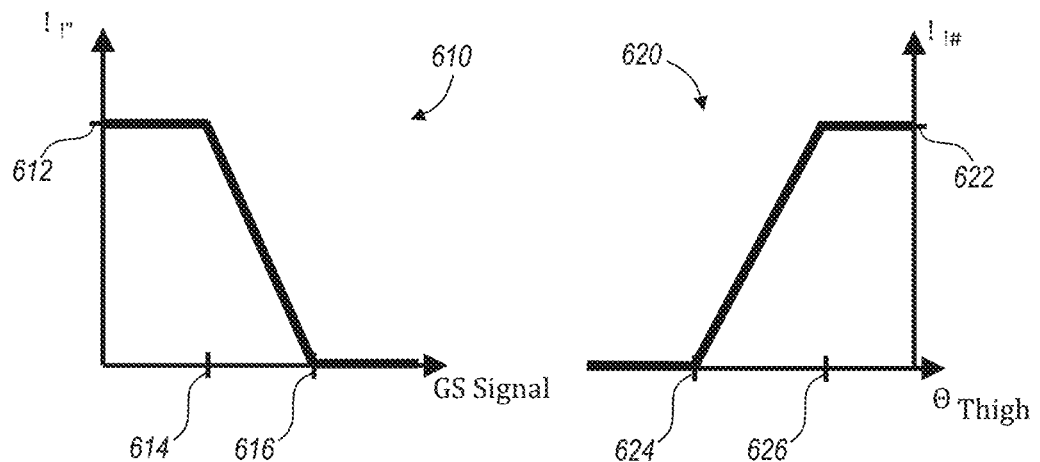
FIG. 6A
FIG. 6B
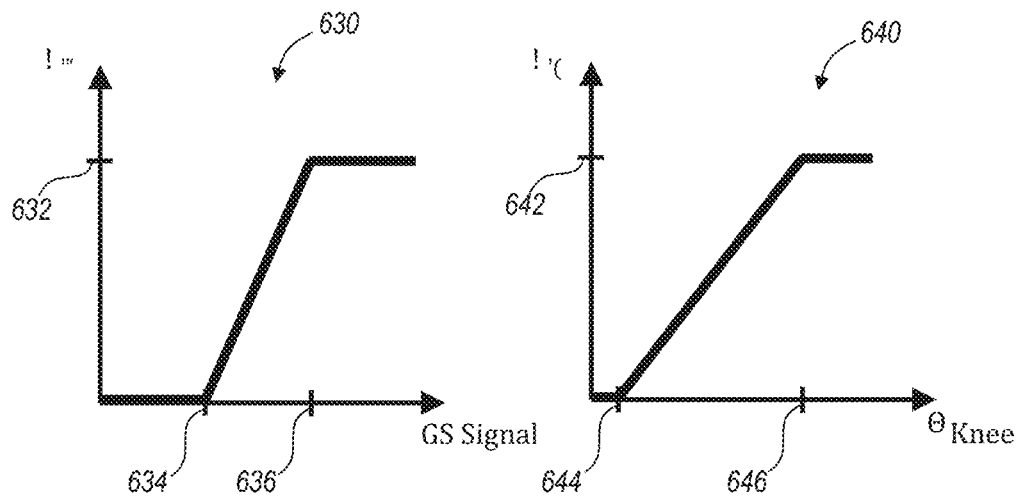
FIG. 6C
FIG. 6D

VOLITIONAL EMG CONTROLLER FOR A POWERED KNEE PROSTHESIS

CROSS-REFERENCE TO RELATED APPLICATIONS

This application claims priority to and the benefit of U.S. Provisional Patent Application Ser. No. 63/541,694, filed Sep. 29, 2023 and titled "Volitional EMG Controller for a Powered Knee Prosthesis," the entirety of which is incorporated herein by reference.

STATEMENT REGARDING FEDERALLY SPONSORED RESEARCH

This invention was made with government support under W81XWH-21-1-0037 awarded by the Defense Health Agency, Medical Research and Development Branch, R01 HD098154 awarded by the National Institutes of Health, and 1925371 awarded by the National Science Foundation. The government has certain rights in the invention.

BACKGROUND

Technical Field

This disclosure relates to powered prosthetic limbs and controllers for operating powered prosthetic limbs.

Related Technology

Recent advances have improved the functionality of prosthetic limbs, including leg prostheses. Leg prostheses include lower leg prostheses configured to attach to the residual limb of a trans-tibial amputee and upper leg prostheses configured to attach to the residual limb of a trans-femoral amputee. Leg prostheses have been configured in size and shape to replace the functionality of the amputated limb.

Advances in leg prostheses include incorporation of newer lightweight materials, sensors that monitor movement of the user and the environment which enable users to adjust their gait or posture, adjustable settings, and improved energy storage and return that may reduce the fatigue experienced by the user. Despite this, many prostheses are not configured to enable the user to traverse many types of terrain. Accordingly, there is a need for improved leg prosthesis designs.

SUMMARY

Disclosed herein are embodiments of a volitional controller configured to control a powered knee prosthesis to aid the user in ascending a set of stairs. The volitional controller may comprise one or more processors and one or more hardware storage devices. The volitional controller may be configured to receive an electromyography (EMG) signal from a single EMG sensor source and to receive a ground state signal from a ground reaction force (GRF) sensor. The EMG sensor source may be a muscle located on the residual limb of the user, such as the biceps femoris muscle of the upper leg. The ground state signal may provide an indication whether the prosthesis is on or off the ground. The volitional controller may then determine a target knee torque based on the received EMG signal and ground state signal.

The volitional controller may be further configured to receive an inertial measurement unit (IMU) signal from an IMU sensor. Determination of the target knee torque may be further based on the IMU signal. Specifically, the IMU signal may be used to determine a thigh angle and/or a knee angle, and which may be used to determine the target knee torque.

After determining a target knee signal, the volitional controller may output a knee torque signal for controlling a powered knee joint of a powered knee prosthesis. When the ground state signal indicates that the prosthesis is off the ground, the EMG signal may be mapped to a knee torque signal exhibiting flexion torque and when the ground state signal indicates that the prosthesis is on the ground, the EMG signal may be mapped to a knee torque signal exhibiting extension torque. The transition of the knee torque signal between flexion torque and extension torque may be continuous.

Determination of the target knee torque may comprise a flexion torque component and an extension torque component. Determination of each of the torque components may comprise multiplying the EMG signal by multiple gains. The flexion torque component may comprise a flexion ground gain and a flexion thigh gain. Similarly, the extension torque component may comprise an extension ground gain and an extension knee gain. The flexion ground gain, flexion thigh gain, extension ground gain, and extension knee gain may each be continuously variable between a lower threshold and an upper threshold.

Determination of the target knee torque may further comprise one or more damping components. The damping components may comprise a thigh damping component and a knee damping component. Each of the damping components may be determined by multiplying the change in knee angle by one or more gains, such as the flexion ground gain, a thigh damping gain, and/or a knee damping gain.

Also disclosed are powered knee and prosthetic leg systems configured to provide volitional control of a prosthetic leg to a user. The system may comprise a powered knee prosthesis and the controller described above. The powered knee prosthesis may comprise a pylon having a proximal and a distal end, the pylon being configured to support the weight of a user. A prosthetic foot may be connected to the distal end of the pylon and a powered knee joint may be connected to the proximal end of the pylon. The powered knee joint may be configured to output a torque determined by the volitional controller. A socket configured to receive a residual limb of a user may be connected to the powered knee joint.

The system may further comprise an EMG sensor, a GRF sensor, and an IMU sensor configured to provide an EMG signal, a grounds state signal, or an IMU signal, respectively, to the volitional controller. The IMU sensor can be disposed at or near a proximal end of the pylon. The powered knee and prosthetic leg system may be configured to enable a user to ascend stairs in a forwards and backwards orientation.

Such volitional controllers and systems may beneficially provide a more natural walking and/or climbing gait and may provide a continuously adjusted torque based on the measurements provided by the sensors. All this may enable the user to walk with less fatigue and without exerting substantial mental resources to control the prosthesis.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

FIGS. 6A-6D illustrate the variability of gain values used to calculate the target knee torque.

DETAILED DESCRIPTION

Introduction

Figure 1:
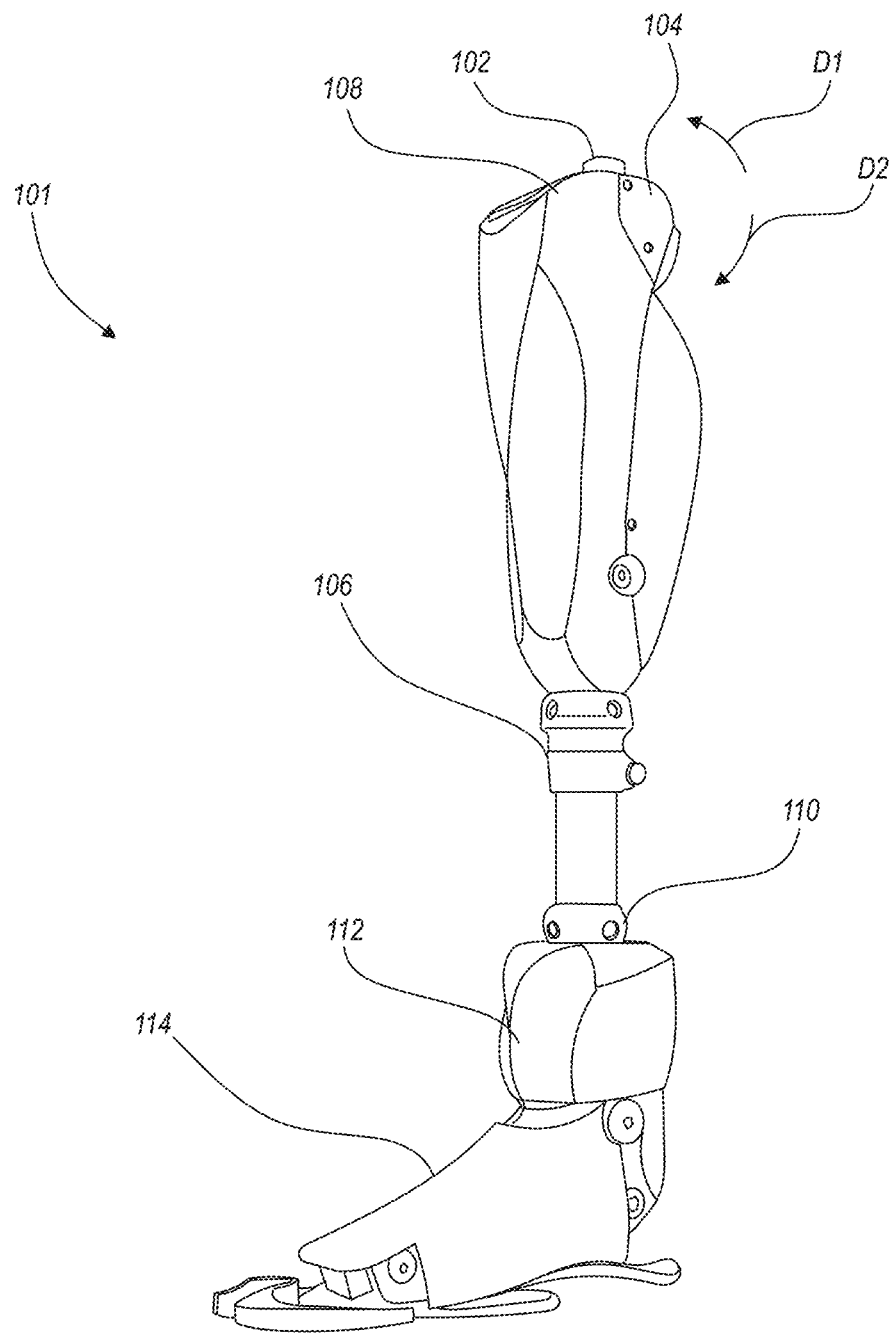
FIG. 1 illustrates an exemplary prosthetic limb comprising a powered knee.

Trans-femoral amputees use prosthetics including a socket to receive the upper leg or thigh. Often, the prosthetic is generally rigid along its length. Other prosthetics include a rotatable joint located where the knee would have been.

Climbing stairs may be a particularly difficult task for trans-femoral amputees. In a non-amputated individual, the muscles and ligaments of the upper leg interact with the knee joint and lower leg to extend and flex the knee joint. In this manner, the knee joint is flexed to bend the knee and enable the leg to be placed on an elevated stair. The knee is then extended to straighten the knee joint and thereby lifting the upper body. The process is then repeated with the other leg.

In contrast, the muscles and ligaments of upper leg amputees are no longer connected to a knee joint or lower leg. Thus, for many prosthetics, all lifting must be done by an appendage that is not attached to prosthetic. For example, an amputee may place the non-amputated leg on each elevated stair and lift with the non-amputated leg. In other instances, the prosthetic leg may be placed on the elevated stair and the amputee may use their hands and arms to pull themselves upward using a grip. However, both of these instances tend to quickly tire the amputee. Furthermore, the amputee generally requires the use of a grip, such as a railing, to maintain balance during climbing.

A powered knee prosthesis may be similar to the upper leg prosthesis described above and may include a powered knee connecting the socket and the pylon. The powered knee may be configured to provide a torque to rotate (or swing) the pylon relative to the socket and upper leg. In this manner, the powered knee may imitate the flexion and extension of a knee joint. Additionally, powered knee prostheses may enable amputees having both of the upper legs amputated to climb stairs.

However, the controllers used for powered knee prosthesis have been overly simple and insufficient to replicate a more natural climbing movement by the user. Simply alternating extension and flexion based on an indication of a ground reaction force signal is overly simplistic and does not lead to natural gait cycle movement.

Many robotic leg prostheses use pre-programmed movements, such that the prosthesis actuates and moves according to a pre-recorded movement from a non-disabled individual while walking. Machine learning models have been incorporated into some robotic leg prostheses to determine what movement the prosthesis should perform. However, such prostheses are generally limited in the number of movements the machine learning model can output and updating of the model may only be performed once every step, such that adaptation of the machine learning model to the particular type of terrain is limited. Additionally, such models do not enable a user to easily change their movement or trajectory mid-step.

Disclosed herein are volitional controllers and powered prosthetic limbs that form a prosthetic system to enable an amputee to climb a set of stairs. The volitional controller may be configured to activate based on activation of muscles in the residual limb. The volitional controller may adapt an output based on the movement and position of the residual limb and powered prosthetic limb in the gait cycle. Such a prosthetic system may enable a powered prosthetic limb to provide a more natural walking and climbing response, and to do so without requiring the user to exercise substantial mental resources to controlling the prosthetic system. That is, the prosthetic system may be controlled by the user by acting as they would have with a non-amputated limb.

Such controllers and paired prosthetic limbs may enable a user to climb stairs at a more natural gait, may provide more natural movement of the prosthetic limb compared to an un-amputated limb. By producing torque, they may reduce the fatigue experienced by the user. They may improve the balance of the user when climbing stairs and reduce the need for the user to hold the railing, improving user motor control and freeing the hands for other tasks. Such controllers and prosthetic limbs may also enable those with dual upper leg amputations to climb stairs.

The principles and components described herein may be used to form a volitional controller configured to operate other prosthetic limbs, such as a volitional controller configured to operate a powered prosthetic ankle, a powered prosthetic arm, or a powered exoskeleton. The volitional controller may be configured to provide volitional control of the powered prosthetic limb to a user, such that an act or intention of the user is translated into an action of the powered prosthetic limb.

Definitions

As used herein, the term "volitional controller" may refer to a device or group of devices configured to coordinate the performance of an electric motor. The volitional controller may be configured to provide control of a user to a prosthetic limb. The volitional controller may comprise one or more processors and/or one or more hardware storage devices.

The volitional controller may comprise a computer or other device configured to algorithmically process incoming signals to operate a powered motor.

As used herein, the term "prosthetic limb" may refer to an artificial limb that replaces a missing body part. The prosthetic limb may primarily refer to a prosthetic leg configured to be attached to the upper leg of a trans-femoral amputee.

As used herein, the term "powered prosthesis," "powered prosthetic leg," or related terms may refer to a prosthetic limb that includes one or more electrical or powered components, such as electrical motors or sensors. The terms may also refer to a prosthetic limb comprising a powered or motored joint.

As used herein, the term "residual limb" may refer to the remaining part of a limb after an amputation. It may refer to the upper leg of a trans-femoral amputee.

As used herein, the term "wearable" or "wearable device" may refer to a device which is configured to be carried on the prosthesis and/or the body of the user.

As used herein, the term "gate cycle" may refer to the repetitive pattern of movement that occurs when a person walks or climbs a set of stairs.

As used herein, the term "ground surface" may refer to a surface with which the prosthetic foot of the powered prosthetic leg interacts during the gait cycle.

As used herein, the term "ground reaction force" (GRF) may refer to a force exerted on the prosthetic limb by the ground surface. The GRF sensor may measure a ground reaction force as the user places their weight on the prosthetic limb.

As used herein, the term "electromyography" (EMG) may refer to measurement of the electrical activity in the muscles and/or nerves that control the muscles.

As used herein, the term "inertial measurement unit" (IMU) may refer to a device that measures a body's specific force, angular rate, and/or orientation of the body. The IMU may incorporate accelerometers, gyroscopes, and/or magnetometers.

As used herein, the terms "continuous" and "continuously variable" refer to the ability of the controller to provide minute changes according to small adjustments measured by the one or more sensors of the prosthetic system. This contrasts with a series of clearly "discrete" changes. For example, a transition of knee torque between flexion torque and extension torque can be "continuous" if there are more than 10, or more than 15, or more than 20 adjustments or changes in state therebetween, for example.

Powered Prosthetic Leg Components

FIG. 1 illustrates a powered prosthetic leg 101 that may comprise one or more powered components configured to be operated with the controller described herein. The powered prosthetic leg 101 may comprise a distally-extending pylon 106 having a proximal end 108 and a distal end 110, the pylon 106 being configured to support the weight of a user. The distal end 110 of the pylon 106 may be connected to a prosthetic foot 114. The prosthetic foot 114 may be a passive prosthetic foot, in that the prosthetic foot 114 does not comprise any powered components. Alternatively, the prosthetic foot 114 may be an active prosthetic foot 114 that may comprise one or more powered components configured to facilitate the walking and climbing movement of the user. The prosthetic foot 114 may be connected to the distal end 110 of the pylon 106 by an adapter 112 (e.g., a pyramid adapter) configured to facilitate connection between the prosthetic foot 114 and the pylon 106. The adapter 112 may be detachable from the pylon 106 to allow different configurations of a prosthetic foot 114 to be attached to the powered prosthetic leg 101.

The powered prosthetic leg 101 may comprise a powered knee prosthesis. Specifically, the powered prosthetic leg 101 may comprise a powered knee joint 104 and may be configured to rotate along at least one axis in a rotation direction RD. The powered knee joint 104 may be located at or near the proximal end 108 of the pylon 106 and may be located at a position that would correspond to the user's knee before amputation. The powered knee joint 104 may be configured to provide various levels of torque to enable the pylon 106 of the powered prosthetic leg 101 to rotate relative to the socket 218 and provide support to the user. The powered knee joint 104 may provide sufficient torque to lift the user and may provide a torque of 10, 20, 30, 40, 50, 60, 70, or more than 70 Nm, or may provide a torque within a range having any two of the foregoing as endpoints.

The powered prosthetic leg 101 may be configured to receive the residual limb 216 (see FIG. 2) of a user. Specifically, the powered prosthetic leg 101 may comprise a socket 218 (see FIG. 2) configured to receive the residual limb. The socket 218 may be configured to receive the residual limb of a trans-femoral amputee (wherein the leg has been amputated above the knee), such that the socket 218 is configured to receive the residual limb 216 of the upper leg of a user. The socket 218 may be formed about the residual limb 216 of the user. For example, the socket 218 may be formed through a molding process such that the socket 218 forms a comfortable and tight fit with the user's residual limb 216. The socket 218 may be attached to an adapter 102 located attached to the powered knee joint 104.

In this manner, the powered knee joint 104 may be configured to, at least in part, replace the knee joint of the amputee user. The powered knee joint 104 may rotate to enable the powered prosthetic leg 101 to flex and extend. This flexion and extension may enable the powered prosthetic leg 101 to provide a more natural ambulatory motion during walking by the user and may be particularly useful to assist the user in climbing stairs. The powered prosthetic leg 101 may be configured to enable the user to ascend stairs in a forwards and/or backwards orientation.

The powered prosthetic leg 101 may comprise metals, such as aluminum, steel, stainless steel, or titanium, or may comprise polymers, such as carbon fiber, glass fiber, or other lightweight and rigid plastics, or may comprise a composite material.

Gait Cycle and System Signals

Figure 2:
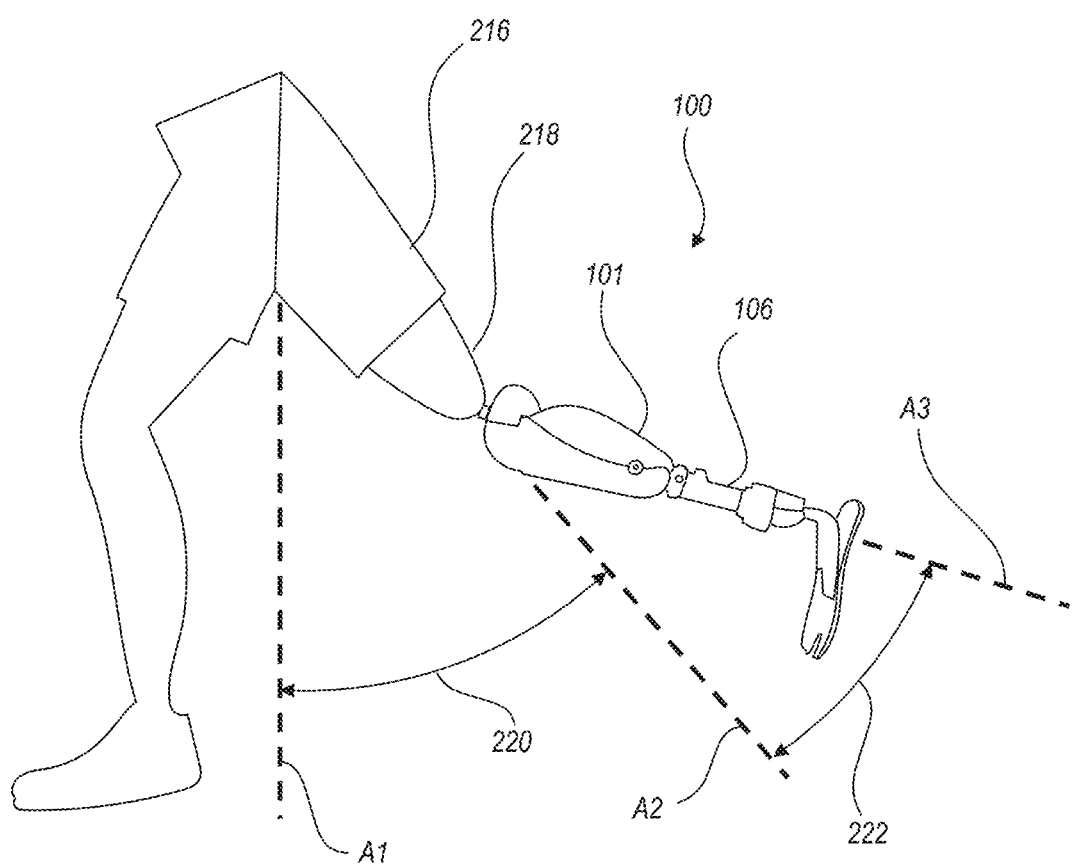
FIG. 2 illustrates the prosthetic limb attached to the upper leg of a user.

FIG. 2 illustrates a user during walking movements, the user having the volitional controller and the powered prosthetic leg 101 attached to the residual limb 216 as part of a powered knee and prosthetic leg system 100. Also illustrated are axes A1, A2, and A3 as well as angles 220 and 222 that will be useful in describing the operation of the volitional controller to manipulate the device. An orientation axis A1 may refer to a line extending in the direction of gravity or may refer to a direction of the normal force acting through the user's non-amputated leg or another prosthetic leg of user. A thigh axis A2 may refer to a line passing through the center of the user's upper leg or thigh, or a line passing through the center of the socket 218. The thigh angle 220 (i.e., $\theta_{Thigh}$) may refer to the angle between the thigh axis A2 and the orientation axis A1. Finally, a pylon axis A3 may refer to a line passing through the center of the pylon 106. The knee angle 222 (i.e., $\theta_{Knee}$) may refer to the angle between the thigh axis A2 and the pylon axis A3. As used herein, the thigh angle 220 is positive behind (posterior to)

the user and negative when in front of (anterior to) the user. Similarly, the knee angle 222 is positive during flexion and approaches a value of 0 degrees at full extension.

By way of explanation, the gait cycle of any one of the user's legs may generally comprise two phases during walking movements: stance phase and swing phase. Stance phase may begin as the user touches the heel of the foot (e.g., the prosthetic foot 114) to the ground (referred as heel strike) and progresses through mid-stance and terminal stance as the user leans through the leg. Swing phase begins at toe-off as the user lifts the foot (e.g., the prosthetic foot 114) off the ground and continues through terminal swing until the user places their foot back on the ground at heel strike. Thus, FIG. 2 illustrates the user during walking movements wherein the powered prosthetic leg 101 is near the beginning of swing phase.

The volitional controller may be connected to one or more sensors attached to or disposed about the powered prosthetic leg 101 that may be used to activate the powered knee joint 104 and/or determine the target torque to be exerted by the powered knee joint 104. The powered knee and prosthetic leg system 100 may include a ground reaction force (GRF) sensor that may measure the amount of force placed on the powered prosthetic leg 101 to support the user. In a broad sense, the GRF sensor may be used to determine if the powered prosthetic leg 101 is in contact with the ground. The GRF sensor may be disposed on or connected to the powered prosthetic leg 101. The GRF sensor may be disposed within the adapter 112 connecting the prosthetic foot to the pylon 106. In other embodiments, the GRF sensor may be disposed within or attached to the prosthetic foot 114 or to the pylon 106. In some embodiments, the GRF sensor may be attached to the adapter 102 or may be attached to or disposed within the socket 218. The GRF sensor may comprise a wearable force plate that measures the force between the powered prosthetic leg 101 and a ground surface and may indicate when the powered prosthetic leg 101 is in contact with or off the ground surface.

The powered knee and prosthetic leg system 100 may comprise one or more inertial measurement unit (IMU) sensors. The IMU sensor(s) may be configured to measure motion and/or orientation of the residual limb 216 and the powered prosthetic leg 101 so as to determine the thigh and knee angles 220, 222. The IMU sensor(s) may be attached to various parts of the powered prosthetic leg 101, the socket 218, and/or the user. For example, the system 100 may comprise a first IMU sensor attached to the socket 218 or the residual limb 216 of the user and a second IMU sensor attached to the powered prosthetic leg 101, such as at the pylon 106 or the prosthetic foot 114. In this way, the IMU signal from both of the IMU sensors may provide the relative orientation between the residual limb 216 and the powered prosthetic leg 101 to determine the thigh and knee angles 220 and 222. In other embodiments, the system 100 may comprise only one IMU sensor. The one IMU sensor may be disposed at the proximal end 108 of the powered prosthetic leg 101. Because the position of the proximal end 108 of the powered prosthetic leg 101 is determined by movement of the residual limb 216 and because the one IMU sensor will rotate relative to the powered knee joint 104 along with the pylon 106 of the powered prosthetic leg 101, the one IMU sensor may provide the orientation of the residual limb 216 as well as the orientation of the powered prosthetic leg 101.

Figure 3:
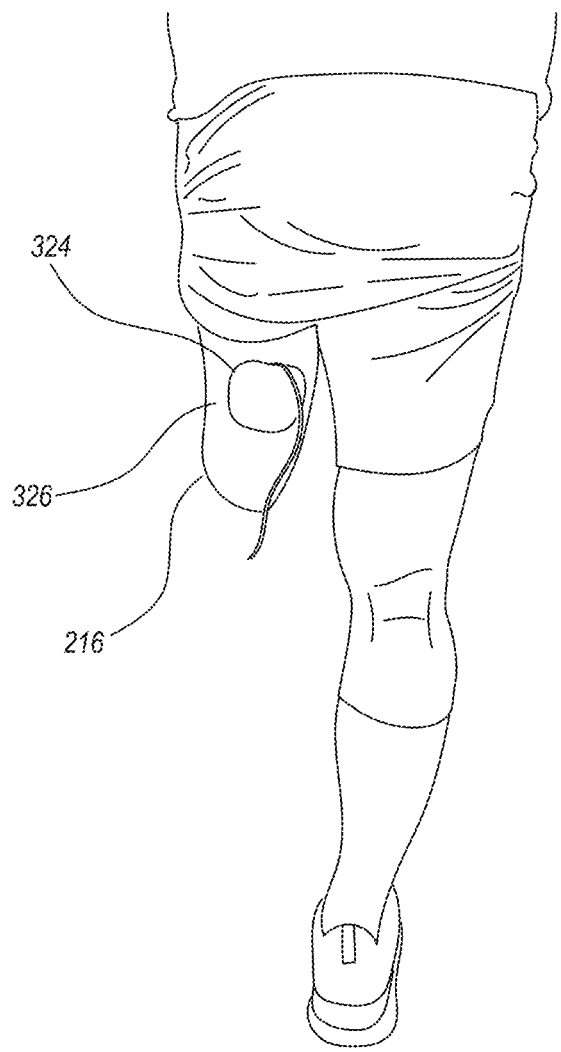
FIG. 3 illustrates a sensor attached to a residual limb.

FIG. 3 illustrates that the powered knee and prosthetic leg system 100 may comprise an electromyography (EMG) sensor 324. The EMG sensor 324 may be attached to the user and may be configured to measure an EMG signal from an EMG sensor source. The EMG sensor 324 may be configured to measure the activation of an EMG sensor source to activate the powered knee joint 104 of the powered prosthetic leg 101. Thus, the powered knee joint 104 may be activated when the EMG sensor source is activated.

The EMG sensor source may be a muscle of the residual limb 216. For example, the EMG sensor source can be the biceps femoris muscle located on a posterior portion 326 of the upper leg. The biceps femoris muscle is an important muscle for regulating movement during the gait cycle. It flexes the knee and extends the thigh at the hip when climbing stairs as well as helps maintain knee and pelvis stabilization.

The EMG sensor 324 may comprise an electrode configured to measure the activation of the EMG sensor source (e.g., the electrical activation of a muscle). The EMG sensor 324 may be calibrated to the user to optimize compatibility with the volitional controller. A manual gain may be applied to the EMG signal before the EMG signal is received by the volitional controller to calibrate the EMG sensor 324. For example, a manual gain may be applied to the EMG signal such that the EMG signal has a peak value in a range from approximately 1 V to approximately 2 V.

The volitional controller may be attached to a portion of the powered knee and prosthetic leg system 100, such as the powered prosthetic leg 101. For example, the volitional controller may be attached to or disposed within the pylon 106. The volitional controller may be attached to the one or more sensors, including the GRF sensor, IMU sensor(s), and EMG sensor 324. The volitional controller may be connected to the one or more sensors by wiring that extends from the sensors to the controller. The wiring may extend along an exterior of the socket 218 and/or the powered prosthetic leg 101, but preferably extends within the socket 218 and the powered prosthetic leg 101 so as to prevent environmental obstacles from snagging the wiring.

The volitional controller may comprise a computer or other hardware device configured to receive one or more inputs and to provide an output of a target torque. The volitional controller may comprise one or more processors and may be connected to one or more hardware storage devices that include instructions operating the powered knee joint 104. In some embodiments, the volitional controller may comprise a computer system.

The volitional controller may comprise one or more hardware storage devices. The one or more hardware storage devices may be configured to store signal data measured by the one or more sensors. The one or more hardware storage devices may be configured to store instructions to be implemented by the volitional controller. The one or more hardware storage devices may comprise a computer readable storage medium that includes volatile and non-volatile, removable and non-removable media, implemented with any technology for the storage of information such as computer readable instructions, data structures, program modules, or other data. Computer readable storage media includes, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

Figure 4:
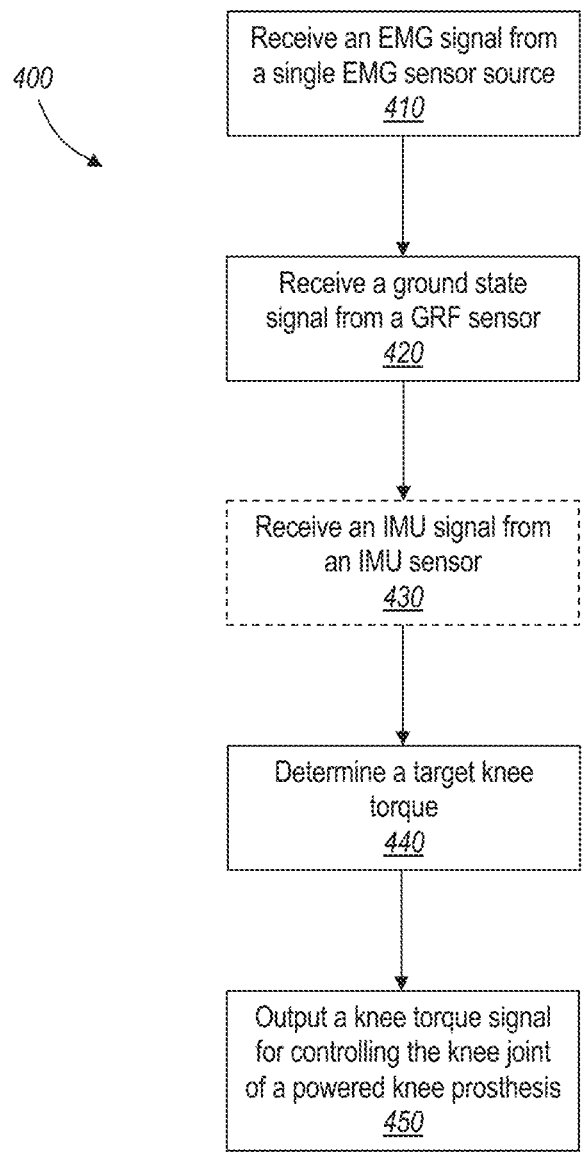
FIG. 4 illustrates a method for controlling a powered knee wherein the target knee torque is determined by two torque components.

FIG. 4 illustrates a method 400 comprising instructions that may be implemented by the volitional controller. The instructions may cause the volitional controller to receive an EMG signal from a single EMG source 410. The instructions may also cause the volitional controller to receive a ground state signal (GS signal) from the GRF sensor 420. The ground state signal may be an indication of whether the powered prosthetic leg 101 is in contact with a ground surface (e.g., a step of stairs). The volitional controller may then determine a target knee torque 440 by using the information provided by the EMG.

The instructions may optionally cause the volitional controller to receive an IMU signal from an IMU sensor 430. The volitional controller may receive multiple IMU signals from multiple IMU sensors. For example, the volitional controller may receive IMU signals from a first IMU sensor attached to the upper leg of the user and a second IMU sensor attached the powered prosthetic leg 101.

After the target knee torque is determined 440 the controller may output a knee torque signal for controlling the knee joint of a powered knee prosthesis 450. The volitional controller may send the output knee torque signal directly to the powered knee prosthesis or may send the output knee torque signal to an electrical component configured to operate the powered knee prosthesis.

Volitional Controller

Figure 5:
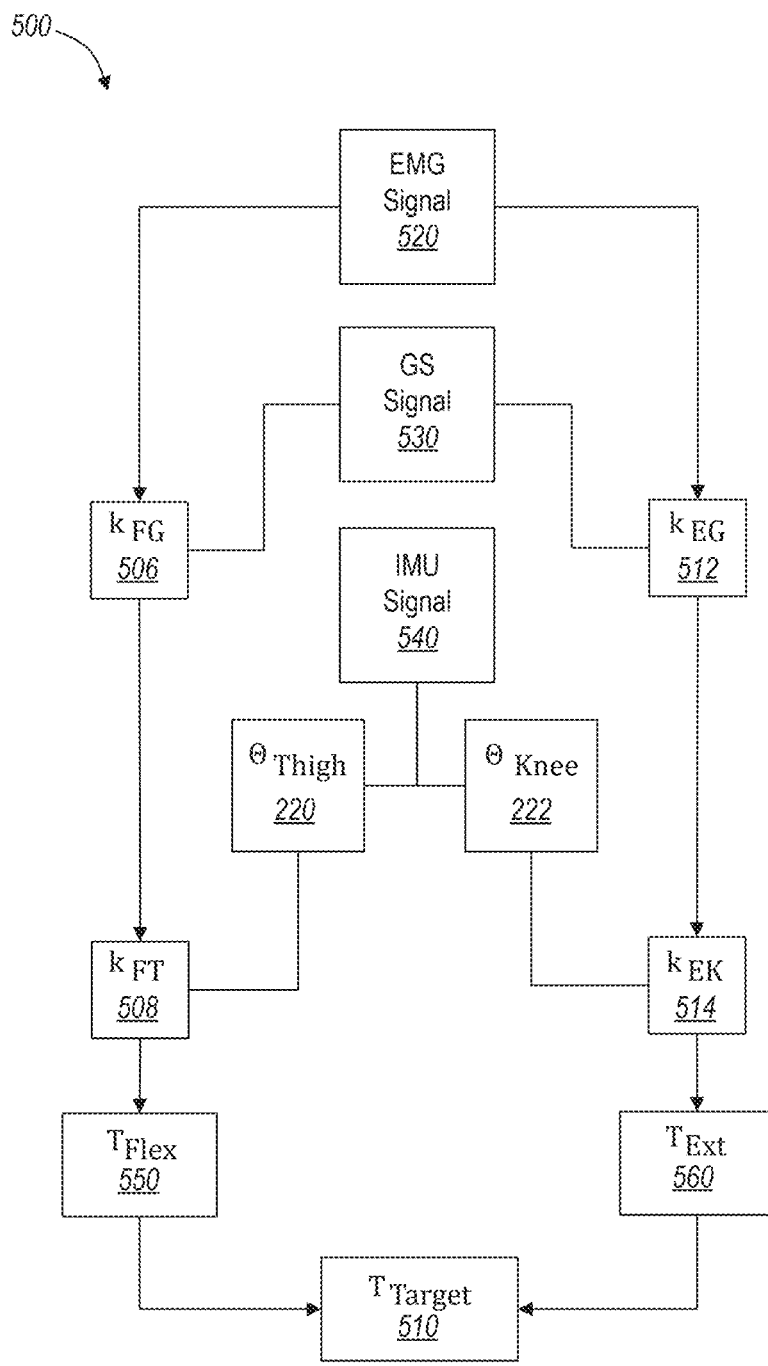
FIG. 5 illustrates a schematic of the controller connected to the prosthetic limb.

FIG. 5 illustrates a schematic 500 of the process used by the volitional controller to determine the target knee torque 510. The target knee torque 510 ($T_{Target}$) can be determined by two torque components comprising a flexion torque component 550 ($T_{Flex}$) and an extension torque component 560 ($T_{Ext}$). Specifically, the target knee torque 510 can be determined by the difference between the flexion torque component 550 and the extension torque component 560 and may be defined by the following relationship: $T_{Target} = T_{Flex} - T_{Ext}$ In this manner, the powered knee joint 104 may be configured to apply a torque and rotate the pylon 106 in a positive direction (direction D1) to flex the powered knee joint 104 or to apply a torque and rotate the pylon 106 in a negative direction (direction D2 opposite direction D1) to extend the powered knee joint 104. The flexion torque component 550 and the extension torque component 560 may be determined from the input of signals from the signal sensors, such as an EMG signal 520, a ground state signal 530, and/or an IMU signal 540 (e.g., from one or more IMU sensors). The IMU signal 540 can be used to determine the thigh angle 220 and/or the knee angle 222. The transition between flexion and extension torque may thus be continuous, such that the target knee torque 510 varies as the EMG signal 520, ground state signal 530, and/or IMU signal 540 varies, rather than that the powered knee may only output a relatively few discrete knee torque signals.

The EMG signal 520 may be configured to activate the powered knee joint 104 when the EMG signal source is activated. In particular, the flexion torque component 550 and the extension torque component 560 may be dependent on the value of the EMG signal 520. The flexion torque component 550 can be determined according to the following relationship: $T_{Flex} = k_{FG} \cdot k_{FT} \cdot EMG$. That is, the flexion torque may be determined as the EMG signal 520 multiplied by two gains, including a flexion ground gain 506 ($k_{FG}$) and a flexion thigh gain 508 ($k_{FT}$).

FIGS. 6A-6B illustrate that the flexion ground gain 506 and the flexion thigh gain 508 may have variable values. The flexion ground gain 506 may have a maximum value 612 and a minimum value. For example, the maximum value 612 of the flexion ground gain 506 may be approximately 1 and the minimum value may be approximately 0, such that the flexion ground gain 506 exhibits a value from approximately 0 to approximately 1. However, the maximum value 612 of the flexion ground gain 506 may be a different value depending on the particular characteristics and/or dimensions of the powered prosthetic leg 101 which the controller is configured to operate.

FIG. 6A shows the relationship 610 between the flexion ground gain 506 and the ground state signal 530 and illustrates that the value of the flexion ground gain 506 may be dependent on the measured ground state signal 530. In particular, the flexion ground gain 506 may be variable between a lower threshold 614 and an upper threshold 616 of the ground state signal 530. The flexion ground gain 506 may be at the maximum value 612 when the ground state signal 530 is at or below the lower threshold 614 and may be at the minimum value when the ground state signal 530 is at or above the upper threshold 616.

The upper and lower thresholds 616, 614 may be configured for determining when the powered prosthetic leg 101 is in contact with the ground surface. The lower threshold 614 may be set within a range from approximately 20 N to approximately 70 N, or from approximately 25 N to approximately 60 N, or from approximately 30 N to approximately 50 N, or from approximately 35 N to approximately 45 N, or may be set to approximately 40 N, or may be set within a range having any two of the foregoing as endpoints. The upper threshold 616 may be set within a range from approximately 50 N to approximately 110 N, or from approximately 60 N to approximately 100 N, or from approximately 65 N to approximately 95 N, or from approximately 70 N to approximately 90 N, or from approximately 75 N to approximately 85 N, or may be set to approximately 80, or may be set within a range having any two of the foregoing as endpoints. For example, the lower and upper thresholds 614, 616 may be set to approximately 40 N and approximately 80 N, respectively. In this manner, the upper and lower thresholds 616, 614 may be used to determine if the user is placing their weight on the powered prosthetic leg 101 and not simply contacting the powered prosthetic leg 101 against another surface.

The flexion ground gain 506 may be linearly related to the ground state signal 530 between the upper and lower thresholds 616, 614. Alternatively, the flexion ground gain 506 may be linearly related to the ground state signal 530 over only a portion of the range between the upper and lower thresholds 616, 614 or may have another relationship with the ground state signal 530, such as an exponential or logarithmic relationship, or a binomial, trinomial, or other polynomial relationship.

FIG. 6B similarly shows the relationship 620 between the flexion thigh gain 508 and the thigh angle 220 and illustrates that the value of the flexion thigh gain 508 may be dependent on the thigh angle 220. The flexion thigh gain 508 may have a maximum value 622 and a minimum value. For example, the maximum value 622 may be approximately 2.75 and the minimum value may be approximately 0, such that the flexion thigh gain 508 exhibits a value from approximately 0 to approximately 2.75. The maximum value 622 of the flexion thigh gain 508 may not necessarily be 2.75, but may be a value corresponding to the particular characteristics and/or dimensions of the powered prosthetic leg 101.

The flexion thigh gain 508 may be variable between a lower threshold 624 and an upper threshold 626 of the thigh angle 220. The flexion thigh gain 508 may be at a minimum value when the thigh angle 220 is at or below the lower threshold 624 and may be at a maximum value 622 when the thigh angle 220 is at or above the upper threshold 626. Thus, the flexion thigh gain 508 may be at or near a maximum value at the end of stance phase and the beginning of swing phase. The lower threshold 624 may be set within a range from approximately negative 30 degrees to approximately negative 70 degrees, or from approximately negative 35 degrees to approximately negative 65 degrees, or from approximately negative 40 degrees to approximately negative 60 degrees, or from approximately negative 45 to approximately negative 55 degrees, or may be set to approximately negative 50 degrees, or may be set within a range having any two of the foregoing as endpoints. The upper threshold 626 may be set within a range from approximately negative 5 degrees to approximately negative 40 degrees, or from approximately negative 10 degrees to approximately negative 30 degrees, or from approximately negative 15 degrees to approximately negative 25 degrees, or may be set to approximately negative 20 degrees, or may be set within a range having any two of the foregoing as endpoints. For example, the lower and the upper thresholds 624, 626 may be set to approximately negative 50 degrees and approximately negative 20 degrees, respectively.

Thus, in at least some embodiments, the upper and the lower thresholds 626, 624 may be set to thigh angles 220 wherein the residual limb 216 is disposed in front of, or anterior to, the torso of the body. By incorporating the flexion ground gain and the flexion thigh gain, this ensures that the flexion torque component is greatest at the beginning of swing phase when the powered prosthetic leg 101 is off the ground and when the thigh angle is greatest.

The flexion thigh gain 508 may be linearly related to the thigh angle 220 between the upper and lower thresholds 626, 624. Alternatively, the flexion thigh gain 508 may be linearly related to the thigh angle 220 over only a portion of the range between the upper and lower thresholds 626, 624 or may have another relationship with the thigh angle 220, such as an exponential or logarithmic relationship, or a binomial, trinomial, or other polynomial relationship.

Returning to FIG. 5, the extension torque component 560 can be determined according to the following relationship: $T_{Ext}=k_{EG} \cdot k_{EK} \cdot EMG$. That is, the extension torque component 560 may be determined as the EMG signal 520 multiplied by two gains, including an extension ground gain 512 ($k_{EG}$) and an extension knee gain 514 ($k_{EK}$).

FIGS. 6C-6D illustrate that the extension ground gain 512 and the extension knee gain 514 may have variable values. The extension ground gain 512 may have a maximum value 632 and a minimum value. For example, the maximum value 632 of the extension ground gain 512 may be approximately 1 and the minimum value may be approximately 0, such that the extension ground gain 512 exhibits a value from approximately 0 to approximately 1. However, the maximum value 632 of the extension ground gain 512 may be a different value depending on the particular characteristics and/or dimensions of the powered prosthetic leg 101 which the controller is configured to operate.

FIG. 6C shows the relationship 630 between the extension ground gain 512 and the ground state signal 530 and illustrates that the value of the extension ground gain 512 may depend on the measured ground states signal 530. In particular, the extension ground gain 512 may be variable between a lower threshold 634 and an upper threshold 636 of the ground state signal 530. The extension ground gain 512 may be at a minimum value when the ground state signal 530 is at or below the lower threshold 634 and may be at the maximum value 632 when the ground state signal 530 is at or above the upper threshold 636.

The upper and lower thresholds 636, 634 may be configured for determining when the powered prosthetic leg 101 is in contact with the ground surface. The values of the upper and lower thresholds 636, 634 may be the same as the values of the upper and lower thresholds 616, 614. Alternatively, the values of the upper and lower thresholds 636, 634 may be different from the values of the upper and lower thresholds 616, 614. For example, both the upper and lower thresholds 636, 634 may be greater than the upper and lower thresholds 616, 614. In another embodiment, the value one of the upper and lower thresholds 636, 634 may be the same as the value of the upper or lower threshold 616, 614. For example, the values of the lower thresholds 634, 614 may be the same value. In some embodiments, the range between the upper and lower thresholds 636, 634 may be larger than the range between the upper and lower thresholds 616, 614, or vice-versa.

The lower threshold 634 may be set within a range from approximately 30 N to approximately 70 N, or from approximately 35 N to approximately 65 N, or from approximately 40 N to approximately 60 N, or from approximately 45 N to approximately 55 N, or may be set to approximately 50 N, or may be set within a range having any two of the foregoing as endpoints. The upper threshold 636 may be set within a range from approximately 80 N to approximately 130 N, or from approximately 85 N to approximately 120 N, or from approximately 90 N to approximately 110 N, or from approximately 95 N to approximately 105 N, or may be set to approximately 100 N, or may be set within a range having any two of the foregoing as endpoints. For example, the lower and the upper thresholds 634, 636 may be set to approximately 50 N and approximately 100 N, respectively. In this manner, the upper and lower thresholds 636, 634 may be used to determine if the powered prosthetic leg 101 is in contact with the ground surface and not that the powered prosthetic leg 101 is merely lightly contacting another surface.

The extension ground gain 512 may have a relationship to the ground state signal 530 between the lower and upper thresholds 634, 636 similar to the flexion ground gain 506 and ground state signal 530 between the lower and upper thresholds 614, 616, as described above. The extension ground gain 512 may be linearly related to the ground state signal 530 between the lower and upper thresholds 634, 636. Alternatively, the extension ground gain 512 may be linearly related to the ground state signal 530 over only a portion of the range between the lower and upper thresholds 634, 636 or may have another relationship with the ground state signal 530 between the lower and upper thresholds 634, 636, such as an exponential or logarithmic relationship, or a binomial, trinomial, or other polynomial relationship.

FIG. 6D shows the relationship 640 between the extension knee gain 514 and the knee angle 222 and illustrates that the value of the extension knee gain 514 may be dependent on the knee angle 222. The extension knee gain 514 may have a maximum value 642 and a minimum value. For example, the maximum value 642 may be approximately 40 and the minimum value may be approximately 0, such that the extension knee gain 514 exhibits a value from approximately 0 to approximately 40. The maximum value 642 of the extension knee gain 514 may not necessarily be 40, but may be a value corresponding to the particular characteristics and/or dimensions of the powered prosthetic leg 101.

The extension knee gain 514 may be variable between a lower threshold 644 and an upper threshold 646 of the knee angle 222. The extension knee gain 514 may be at a minimum value when the knee angle 222 is at or below the lower threshold 644 and may be at a maximum value 642 when the knee angle 222 is at or above the upper threshold 646. Thus, the extension knee gain 514 may be at or near a maximum value at the end of swing phase and the beginning of stance phase when the knee angle 222 is greatest, such that the extension knee gain contributes to the extension torque most at the beginning of stance phase when extension torque is needed.

The lower threshold 644 may be set within a range from approximately 3 degrees to approximately 18 degrees, or from approximately 5 degrees to approximately 15 degrees, or from approximately 6 degrees to approximately 14 degrees, or from approximately 8 degrees to approximately 12 degrees, or may be set to approximately 10 degrees, or may be set within a range having any two of the foregoing as endpoints. The upper threshold 646 may be set within a range from 20 degrees to approximately 60 degrees, or from approximately 25 degrees to approximately 55 degrees, or from approximately 30 degrees to approximately 50 degrees, or from approximately 35 degrees to approximately 45 degrees, or from approximately 40 degrees, or may be set within a range having any two of the foregoing as endpoints. For example, the lower and upper thresholds 644, 646 may be set to approximately 5 degrees and 40 degrees, respectively.

The extension knee gain 514 may depend on the knee angle 222 in a manner similar to the relationship between the flexion thigh gain 508 and the thigh angle 220. The extension knee gain 514 may be linearly related to the knee angle 222 between the upper and lower threshold 646, 644. Alternatively, the extension thigh gain 514 may be linearly related to the knee angle 222 over only a portion of the range between the upper and lower thresholds 646, 644 or may have another relationship with the knee angle 222, such as an exponential or logarithmic relationship, or a binomial, trinomial, or other polynomial relationship.

The flexion ground gain 506 and the extension ground gain 512 may be compared to obtain a better understanding of the performance of the powered knee joint 104. Both the flexion ground gain 506 and the extension ground gain 512 are dependent on the ground state signal 530. When the ground state signal 530 indicates that the powered prosthetic leg 101 is off the ground surface and/or in swing phase (e.g., when the ground state signal 530 is below both of the lower thresholds 614, 634) then the flexion ground gain 506 may be at or near its maximum value 612 and the extension ground gain 512 may be at or near its minimum value (e.g., a value of 0). In such instances, the flexion torque component 550 may be relatively large and the extension torque component 560 may be relatively small, such that the target knee torque 510 is positive or is mapped to a flexion torque.

Conversely, when the ground state signal 530 indicates that the powered prosthetic leg 101 is in contact with the ground surface and/or in stance phase (e.g., the ground state signal 530 is above both of the upper thresholds 616, 636) then the flexion ground gain 506 may be at or near its minimum value (e.g., a value of 0) and the extension ground gain 512 may be at or near its maximum value 632. In such instances, the flexion torque component 550 may be relatively large and the extension torque component 560 may be relatively small, such that the target knee torque 510 is negative or is mapped to an extension torque. In this manner, the EMG signal 520 may be mapped to flexion or extension torque. That is, when the ground state signal 530 indicates that the powered prosthetic leg 101 is off the ground, the EMG signal 520 may be mapped to a knee torque signal exhibiting flexion torque, and when the ground state signal 530 indicates that the powered prosthetic leg 101 is on the ground, the EMG signal 520 may be mapped to a knee torque signal exhibiting extension torque.

Again, the target knee torque 510, the flexion torque component 550, and the extension torque component 560 may be continuously variable based on the particular position of the user during the gait cycle. This is because the flexion ground gain 506, the flexion thigh gain 508, the extension ground gain 512, and the extension knee gain 514 are continuously variable based on the continuous variance of the EMG signal 520, the ground state signal 530, and the thigh and knee angles 220, 222 based on the IMU signal 540. In particular, the flexion ground gain 506, the flexion thigh gain 508, the extension ground gain 512, and the extension knee gain 514 are continuously variable between the lower thresholds 614, 624, 634, 644 and the upper thresholds 616, 626, 636, 646.

Volitional Controller in Operation

FIGS. 7A-7B and 8A-8B schematically illustrate the gait cycle of a user as they climb a set of stairs 752. Each of the stairs 752 illustrates a lower step 754 and an upper step 756. It may be helpful to the reader to illustrate how the target knee torque 510 is determined at different moments in the gait cycle. In each of these moments, the user may be exerting the GRF sensor source (e.g., the biceps femoris muscle) to ascend the stairs 752.

Figure 7A:
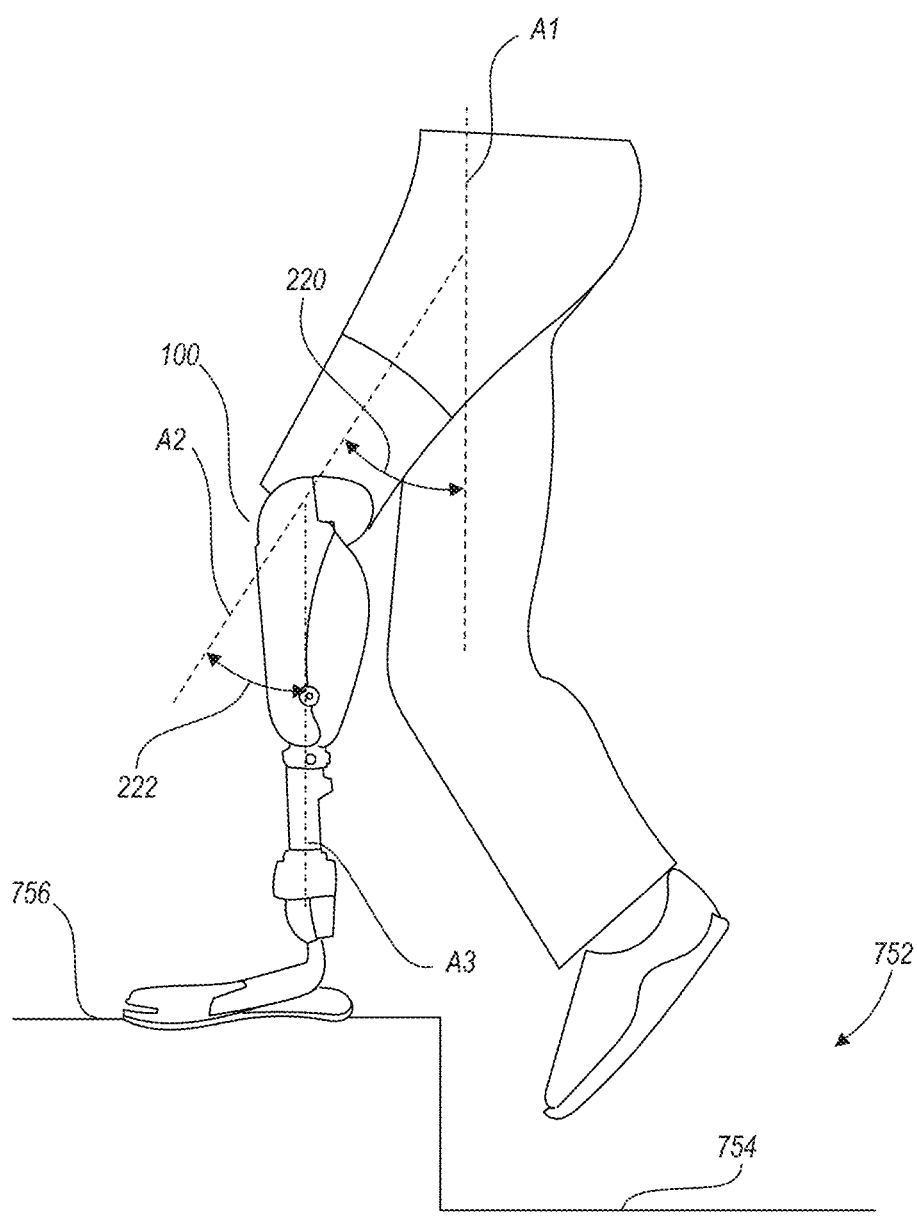
FIGS. 7A-7B illustrate an exemplary powered knee and prosthetic limb system in use near the beginning and end, respectively, of stance phase in the gait cycle during climbing of stairs.

FIG. 7A illustrates the user when the powered prosthetic leg 101 is near the beginning of stance phase. At this moment, the prosthetic foot 114 may be in contact with the ground surface, such that the GRF sensor provides a ground state signal 530 indicating that the prosthetic foot 114 is in contact with the ground surface. For example, the GRF sensor may provide a ground state signal 530 of 100 N or more. The IMU sensor(s) may also provide one or more IMU signals 540 to the volitional controller, from which the thigh angle 220 and the knee angle 222 may be calculated. At this moment, the thigh angle 220 may be calculated to be between negative 20 degrees or less (the residual limb 216 being positioned anteriorly of the user's torso). The knee angle 222 may be approximately 30 degrees.

Thus, the flexion ground gain 506 may be at a corresponding minimum value (e.g., at or near 0) and the flexion thigh gain 508 may be at or near a maximum value 622 (e.g., at or near 2.75). The extension ground gain 512 may likely be at a maximum value 632 (e.g., a value of 1) and the extension knee gain 514 may be near or at a maximum value 642 (e.g., at or near 40). In this instance, the flexion torque component 550 may be relatively small and the extension torque component 560 may be relatively large, such that the target knee torque 510 is mapped to a relatively large extension torque.

Figure 7B:
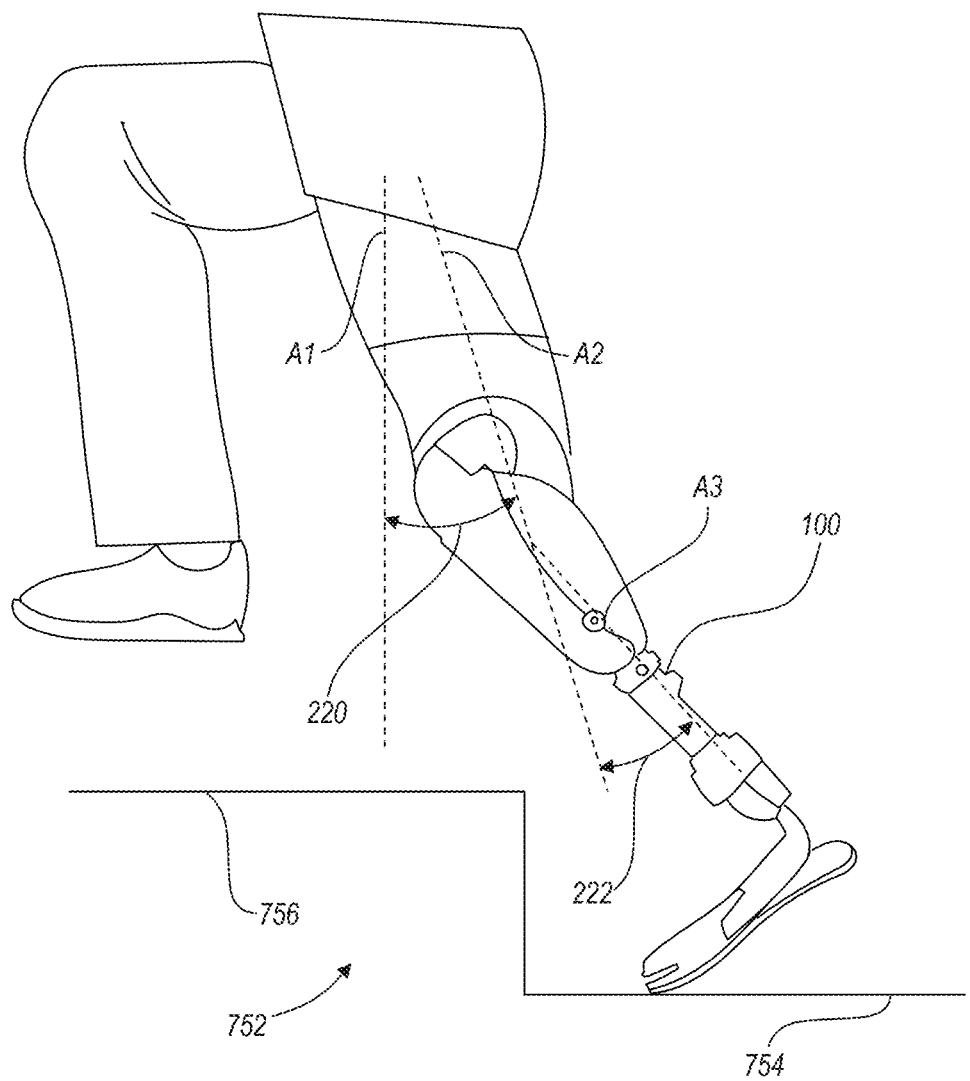

FIG. 7B illustrates the powered prosthetic leg 101 as the user moves through to the end of stance phase. In this moment, the GRF sensor may continue to indicate that the prosthetic foot 114 is in contact with the ground surface. However, the IMU signal 540 may change as the thigh and knee angles 220, 222 are adjusted through stance phase. In particular, the thigh angle 220 may be calculated to be greater than 0 as the residual limb 216 and powered prosthetic leg 101 are positioned posteriorly and the knee angle 222 may be decreased relative to knee angle 222 in FIG. 7A as the powered prosthetic leg 101 straightens relative to the residual limb 216 during extension.

Thus, the flexion ground gain 506 may continue to be at a corresponding minimum value (e.g., at or near 0) and the flexion thigh gain 508 may be at the maximum value 622

(e.g., at or near 2.75). The extension ground gain 512 may likely continue to be at a maximum value 632 (e.g., at or near a value of 1) and the knee angle may be closer to the lower threshold 644 such that the extension knee gain 514 may be closer to the minimum value. In this instance, the flexion torque component 550 may continue to be relatively small and the extension torque component 560 may relatively large, such that the target knee torque 510 is mapped to an extension torque. However, the extension torque component 560 may be less than that observed in the powered prosthetic leg 101 in the position of FIG. 7A, such that the extension torque exhibited by the powered knee joint 104 decreases as powered knee joint 104 becomes further extended. This ensures that the greatest extension torque is provided at the beginning of stance phase when a greater amount of torque is needed to lift the user.

Figure 8A:
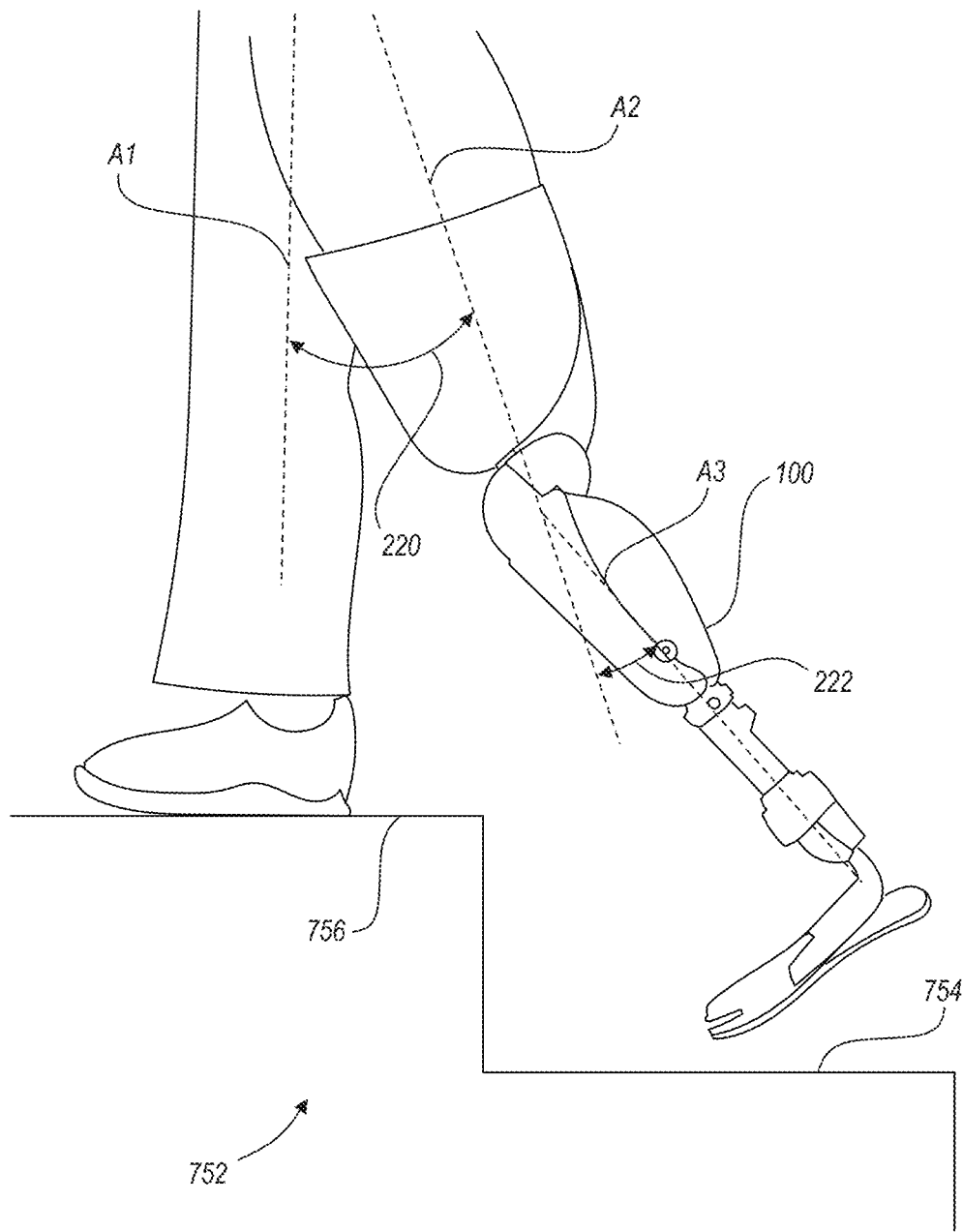
FIGS. 8A-8B illustrates the exemplary powered knee and prosthetic limb system in use near the beginning and end, respectively, of swing phase in the gait cycle during climbing of stairs.

FIG. 8A illustrates the user when the powered prosthetic leg 101 is near the beginning of swing phase. At this moment, the prosthetic foot 114 may no longer be in contact with the ground surface, such that the GRF sensor provides a ground state signal 530 of indicating that the prosthetic foot 114 is not in contact with the ground surface. For example, the GRF sensor may provide a ground state signal 530 of 40 N or less. The IMU sensors(s) may provide one or more IMU signals 540 from which the thigh angle 220 may be calculated to be positive (i.e., generally located posteriorly of the user's torso) and the knee angle 222 may be calculated to be at or near the lower threshold 644 (e.g., a knee angle 222 of 20 degrees or less).

Thus, the flexion ground gain 506 may be at or near the maximum value 612 (e.g., at or near a value of 1) and the flexion thigh gain 508 may be at or near the maximum value 622. The extension ground gain 512 may be at or near a corresponding minimum value (e.g., a value of 0) and the extension knee gain 514 may be at relatively small. In this instance, the flexion torque component 550 may be relatively large and the extension torque component 560 may be relatively small, such that the target knee torque 510 is mapped to a relatively large flexion torque.

Figure 8B:
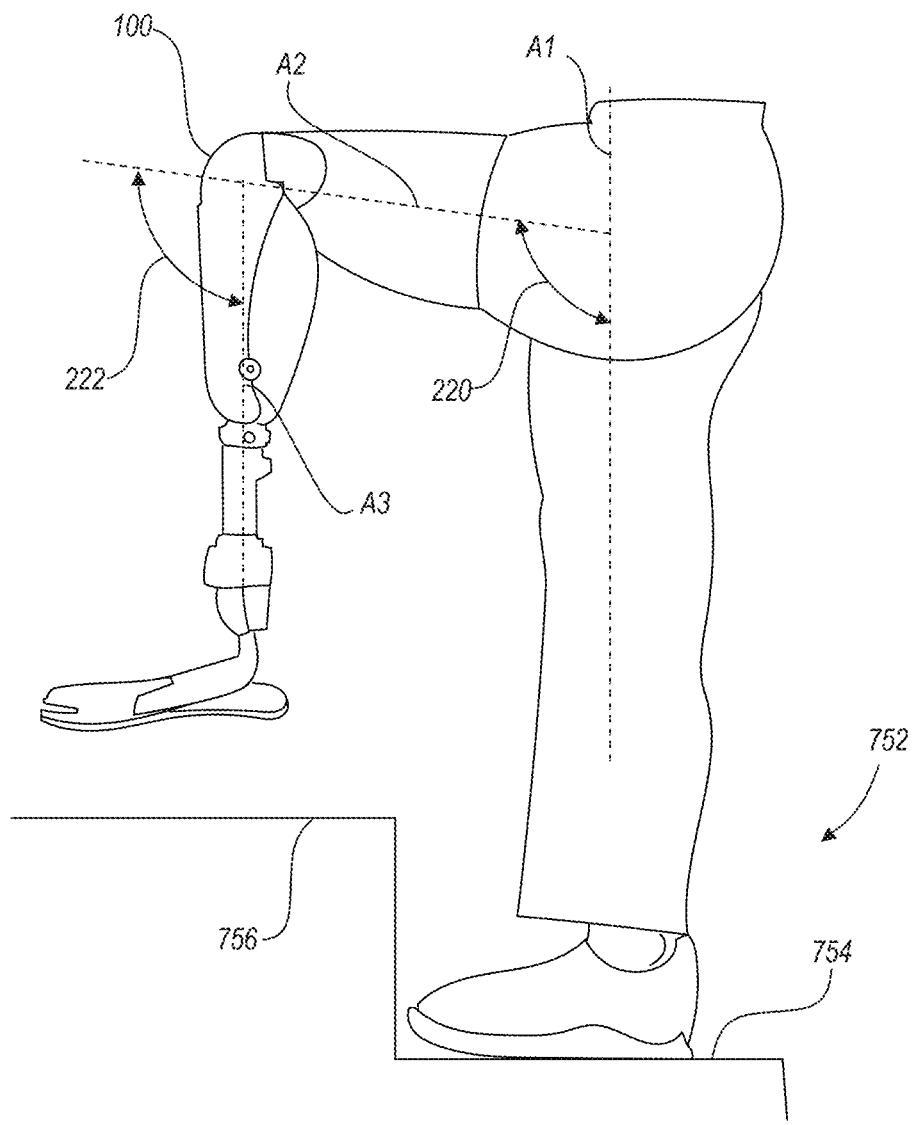

FIG. 8B illustrates the powered prosthetic leg 101 as the user moves through to the end of swing phase. In this moment, the GRF sensor may continue to indicate that the prosthetic foot 114 is not in contact with the ground surface. The IMU signal 540 may change as the thigh and knee angles 220, 222 are adjusted through stance phase. In particular, the thigh angle 220 may be calculated to be less than 0 (e.g., less than negative 45 degrees, with the residual limb 216 being positioned anteriorly of the user's torso) and the knee angle 222 may be increased relative to the knee angle 222 in FIG. 8A to lift the powered prosthetic leg 101 in front of the user above the upper step 756 of the stairs 752.

Thus, the flexion ground gain 506 may continue to be at or near the maximum value 612 (e.g., a value of 1) and the flexion thigh gain 508 may be at or near a minimum value (e.g., a value minimally above 0). The extension ground gain 512 may continue to be at or near the minimum value (e.g., a value of 0) and the extension knee gain 514 may be relatively high, such as at or near the maximum value 642. In this instance the flexion torque component 550 may be relatively small, but the extension torque component 560 may be near zero. Thus, the target knee torque 510 may continue to be mapped to flexion torque, but the flexion torque may be less than when the powered prosthetic leg 101 is at the beginning of swing phase. This ensures that the greatest flexion torque is provided at the beginning of swing phase to flex the powered knee joint 104 and allow the powered prosthetic leg 101 to be lifted above the upper step 756.

While FIGS. 7A-8B have illustrated the determination of the target knee torque 510 through the gait cycle when the user is ascending stairs 752 in a forward direction, one skilled in the art will also appreciate that the above described configuration of powered prosthetic leg 101 may also enable a user to ascend stairs 752 in a backwards direction. That is, the configuration of powered prosthetic leg 101 may enable a user to ascend stairs 752 with their front towards the upper step 756 and to ascend stairs 752 with their back towards the upper step 756.

Damping Components

Figure 9:
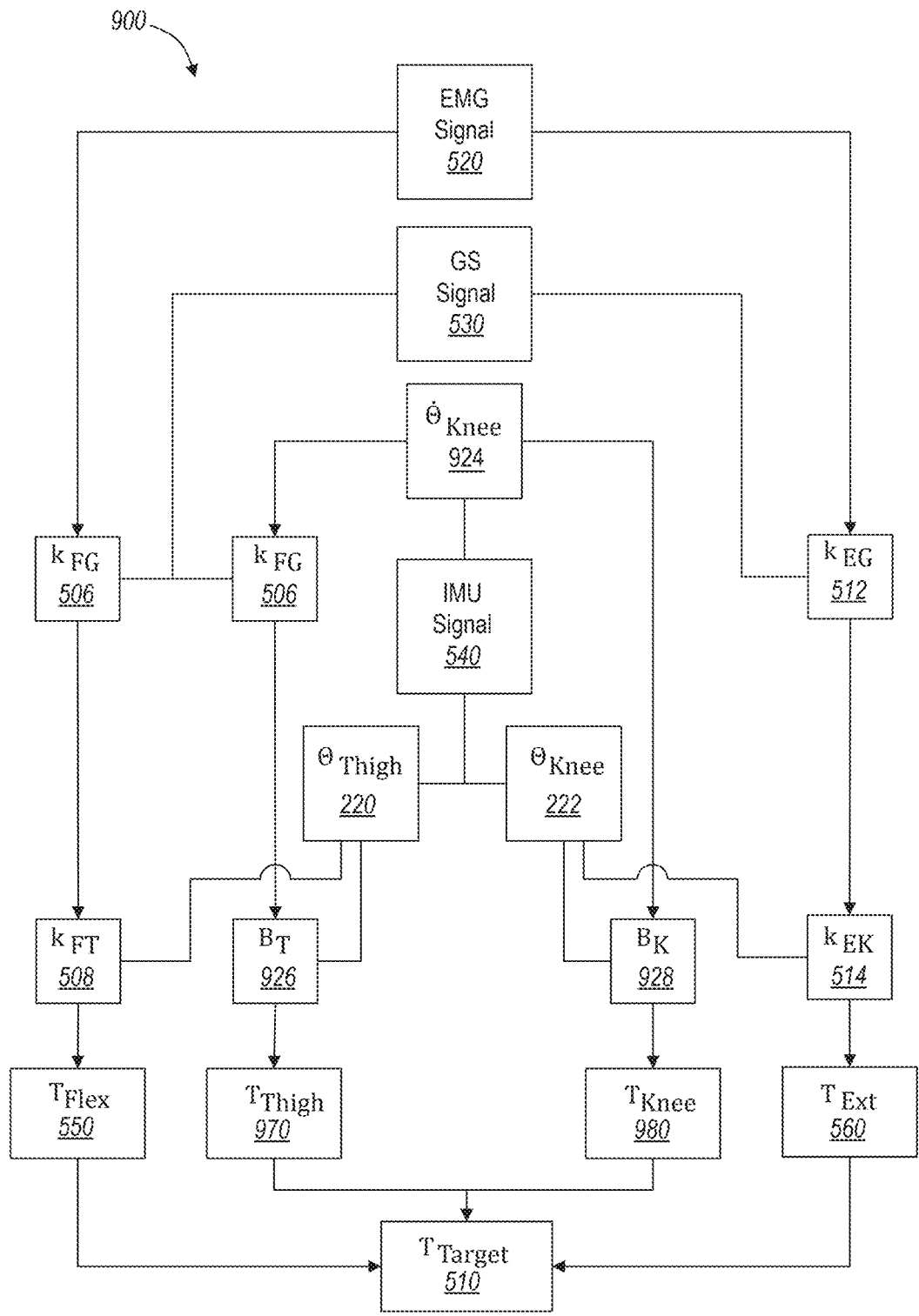
FIG. 9 illustrates a method for controlling a powered knee wherein the target knee torque is determined by four torque components, including two damping components.

FIG. 9 illustrates that the target knee torque 510 may be determined using one or more damping components. In particular, FIG. 9 illustrates a schematic 900 of the process used by the volitional controller to determine the target knee torque 510 using a thigh damping component 970 ($T_{Thigh}$) and a knee damping component 980 ($T_{Knee}$). The damping components 970, 980 may be used to slow or reduce changes in the target knee torque 510 and/or to slow powered knee movements during critical gait phases to provide a more comfortable experience for the user. Thus, the target knee torque 510 may be defined by the following relationship: $T_{Target}=T_{Flex}-T_{Ext}+T_{Thigh}+T_{Knee}$ While the flexion and extension torque components 550, 560 are determined by applying gains to the EMG signal 520, the thigh and knee damping components 970, 980 are determined by applying gains to the knee angle velocity 924 ($\dot{\theta}_{knee}$). Thus, the thigh and knee damping components 970, 980 may only adjust the torque of the powered knee joint 104 when the powered knee joint 104 is activated through the user activating the EMG signal source. The knee angle velocity 924 may be determined as the change in the knee angle 222 over a period of time. The knee angle velocity 924 may be calculated based on multiple of the most recent knee angles 222 exhibited by powered prosthetic leg 101. For example, the knee angle velocity 924 may be calculated based on the two, three, four, five, or more than five of the most recent knee angles 222 or up to or beyond ten, one hundred, or one thousand of the most recent knee angles 222. The knee angle velocity 924 may be calculated based on the knee angles 222 observed in a recent period of time, such as the last tenth of second, half second, second, two seconds, three seconds, or more seconds. The hardware storage devices may be configured to store the amount of data described above to calculate the knee angle velocity 924.

The thigh damping component 970 can be determined according to the following relationship: $T_{Thigh}=k_{FG} \cdot B_T \cdot \dot{\theta}_{knee}$. That is, the thigh damping component 970 can be determined as the knee angle velocity 924 multiplied by two gains, including the flexion ground gain 506 and a thigh damping gain 926 ($B_T$). The flexion ground gain 506 may be the same as that described above and may be similarly dependent on the ground state signal 530, may have a minimum value and maximum value 612, and may be variable between the lower and upper thresholds 614, 616.

Figure 10A:
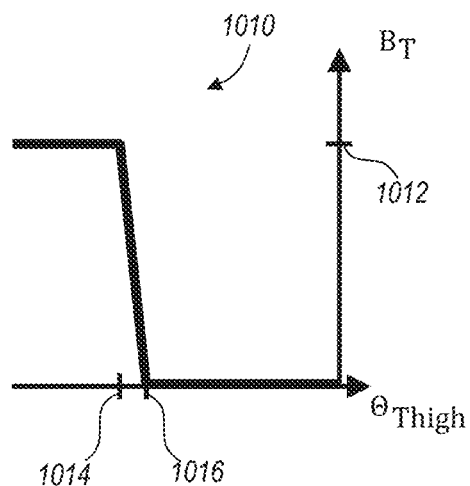
FIGS. 10A-10B illustrate the variability of gain values used to calculate the damping components.

FIG. 10A illustrates a mathematical relationship 1010 and shows that the thigh damping gain 926 may depend on the thigh angle 220. The thigh damping gain 926 may have a minimum value and a maximum value 1012. For example, the minimum value may be approximately 0 and the maximum value may be approximately 0.1, such that the thigh damping gain 926 exhibits a value from approximately 0 to approximately 0.1. However, the minimum value and the maximum value 1012 of the thigh damping gain 926 may have a different value depending on the particular characteristics and/or dimension of the powered prosthetic leg 101. The thigh damping gain 926 may be variable between a lower threshold 1014 and an upper threshold 1016, both of which may be values below 0 (i.e., when the residual limb 216 is positioned anteriorly of the user's torso).

The thigh damping gain 926 may be at a maximum value 1012 when the thigh angle 220 is at or below the lower threshold 1014 and may be at the minimum value when the thigh angle 220 is at or above the upper threshold 1016. The lower threshold 1014 may be set within a range from approximately negative 40 degrees to approximately negative 60 degrees, or from approximately negative 43 degrees to approximately negative 57 degrees, or from approximately negative 45 degrees to approximately negative 55 degrees, or from approximately negative 48 degrees to approximately negative 52 degrees, or may be set to approximately negative 50 degrees, or may be set within a range having any two of the foregoing endpoints. The upper threshold 1016 may be set within a range from approximately 35 degrees to approximately negative 55 degrees, or from approximately negative 38 degrees to approximately negative 52 degrees, or from approximately negative 40 degrees to approximately negative 50 degrees, or from approximately negative 43 degrees to approximately negative 47 degrees, or may be set to approximately negative 45 degrees, or may be set within a range having any two of the foregoing values as endpoints. For example, the lower and upper thresholds 1014, 1016 may be set to approximately negative 50 degrees and approximately negative 45 degrees, respectively. Thus, the thigh damping gain 926 may have a minimum value (e.g., a value of 0) at the beginning of swing phase when the residual limb 216 is substantially vertical or positioned posteriorly of the user's torso and the powered knee joint 104 needs to flex quickly to clear the upper step 756.

The thigh damping gain 926 may be at the maximum value 1012 at the end of the swing phase when the thigh is positioned anteriorly of the user's torso. Thus, the thigh damping component 970 may operate to reduce the flexion of the powered knee joint 104 at the end of swing phase when the thigh damping gain 926 is large and the knee angle velocity 924 is negative (wherein the thigh angle 220 is decreasing as the residual limb 216 moves anteriorly).

The knee damping component 980 can be determined according to the following relationship: $T_{Knee} = B_K \cdot \dot{\theta}_{knee}$. That is, the knee damping component 980 can be determined as the knee angle velocity 924 multiple by a knee damping gain 928 ($B_K$).

Figure 10B:
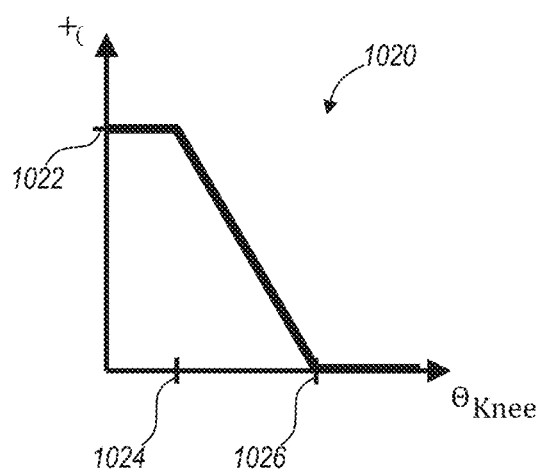

FIG. 10B illustrates a mathematical relationship 1020 and shows that the knee damping gain 928 may depend on the knee angle 222. The knee damping gain 928 may have a minimum value and a maximum value 1022. For example, the minimum value may be approximately 0 and the maximum value 1022 may be approximately 0.1, such that the knee damping gain 928 exhibits a value from approximately 0 to approximately 0.2. However, the minimum value and the maximum value 1022 of the knee damping gain 928 may have a different value depending on the particular characteristics and/or dimension of the powered prosthetic leg 101.

The knee damping gain 928 may be at a maximum value 1022 when the knee angle 222 is at or below the lower threshold 1024 and may be at the minimum value when the knee angle 222 is at or above the upper threshold 1026. The lower threshold 1024 may be set within a range from approximately 3 degrees to approximately 25 degrees, or from approximately 5 degrees to approximately 20 degrees, or from approximately 8 degrees to approximately 15 degrees, or from approximately 10 degrees to approximately 12 degrees, or may be set within a range having any two of the foregoing as endpoints. The upper threshold 1026 may be set within a range from approximately 20 degrees to approximately 45 degrees, or from approximately 22 degrees to approximately 40 degrees, or from approximately 25 degrees to approximately 35 degrees, or from approximately 28 degrees to approximately 32 degrees, or may be set to approximately 30 degrees, or may be set within a range having any two of the foregoing as endpoints.

The knee damping component 980 may only be applied or used to determine the target knee torque 510 when the powered knee joint is extended (i.e., when the knee angle velocity 924 is less than 0). In this manner, the knee damping component 980 operates to slow the extension of the powered knee joint 104, particularly at the end of stance phase when the knee angle 222 is smallest.

Additional Terms & Definitions

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

The various features of a given embodiment can be combined with and/or incorporated into other embodiments disclosed herein. Thus, disclosure of certain features relative to a specific embodiment of the present disclosure should not be construed as limiting application or inclusion of said features to the specific embodiment. Rather, it will be appreciated that other embodiments can also include such features.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 10%, less than 5%, less than 1%, less than 0.1%, or less than 0.01% of the stated amount, value, or condition.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent may also include two or more such referents.

The embodiments disclosed herein should be understood as comprising/including disclosed components, and may therefore include additional components not specifically described. Optionally, the embodiments disclosed herein are essentially free or completely free of components that are not specifically described. That is, non-disclosed components may optionally be completely omitted or essentially omitted from the disclosed embodiments.

Example Aspects

The following clauses provide a non-exhaustive list of example aspects of the disclosed volitional controller for a powered knee prosthesis:

Clause 1. A volitional controller for a powered knee prosthesis, comprising: one or more processors; and one or more hardware storage devices having instructions stored thereon that are executable by the one or more processors to cause the volitional controller to at least: receive an electromyography (EMG) signal from a single EMG sensor source; receive a ground state signal from a ground reaction force (GRF) sensor; determine a target knee torque based on the received EMG signal and ground state signal; and output a knee torque signal for controlling a powered knee joint of a powered knee prosthesis.

Clause 2. The volitional controller of clause 1, wherein when the ground state signal indicates that the prosthesis is off the ground, the EMG signal is mapped to a knee torque signal exhibiting flexion torque, and wherein when the ground state signal indicates that the prosthesis is on the ground, the EMG signal is mapped to a knee torque signal exhibiting extension torque.

Clause 3. The volitional controller of clause 2, wherein transition of the knee torque signal between flexion torque and extension torque is continuous.

Clause 4. The volitional controller of any preceding clause, wherein the EMG sensor source is a biceps femoris muscle.

Clause 5. The volitional controller of any preceding clause, wherein the instructions further cause the volitional controller to receive an inertial measurement unit (IMU) signal from an IMU sensor.

Clause 6. The volitional controller of clause 5, wherein determining the target knee torque is further based on the IMU signal.

Clause 7. The volitional controller of clause 5 or clause 6, wherein the IMU signal is used to determine a thigh angle and/or a knee angle.

Clause 8. The volitional controller of any preceding clause, wherein determining the target knee torque comprises a flexion torque component and an extension torque component.

Clause 9. The volitional controller of clause 8, wherein the flexion torque component comprises a flexion ground gain and a flexion thigh gain and wherein both of the flexion gains are each continuously variable between a lower threshold and an upper threshold.

Clause 10. The volitional controller of clause 8 or clause 9, wherein the extension torque component comprises an extension ground gain and an extension knee gain and wherein both of the extension gains are each continuously variable between a lower threshold and an upper threshold.

Clause 11. The volitional controller of any of clauses 8-10, wherein determining the target knee torque further comprises one or more damping components.

Clause 12. A powered knee and prosthetic leg system configured to provide volitional control to a user, the system comprising: a powered knee prosthesis; and the controller of any of clauses 1-11.

Clause 13. The powered knee and prosthetic leg system of clause 12, wherein the powered knee prosthesis comprises: a pylon having a proximal and a distal end; a prosthetic foot connected to the distal end of the pylon; a powered knee joint connected to the proximal end of the pylon; and a socket configured to receive a residual limb of a user, wherein the socket is connected to the powered knee joint.

Clause 14. The powered knee and prosthetic leg system of clause 13, wherein the powered knee prosthesis further comprises an EMG sensor, a GRF sensor, and an IMU sensor.

Clause 15. The powered knee and prosthetic leg system of clause 14, wherein the IMU sensor is disposed at or near a proximal end of the pylon.

Clause 16. The powered knee and prosthetic leg system of any of clauses 12-15, wherein the powered knee and prosthetic leg system is configured to enable a user to ascend stairs in a forwards and backwards orientation.

Clause 17. A method for controlling a powered knee prosthesis, optionally such as in any of clauses 12-16, comprising: receiving an EMG signal from a single EMG sensor source; receiving a ground state signal from a ground reaction force (GRF) sensor; determining a target knee torque based on the received EMG signal and ground state signal; and outputting a knee torque signal for controlling a powered knee joint of a powered knee prosthesis.

Clause 18. The method of clause 17, wherein when the ground state signal indicates that the powered knee prosthesis is off the ground, the EMG signal is mapped to a knee torque signal exhibiting flexion torque, and wherein when the ground state signal indicates that the powered knee prosthesis is on the ground, the EMG signal is mapped to a knee torque signal exhibiting extension torque.

Clause 19. The method of clause 17 or clause 18, further comprising receiving an inertial measurement unit (IMU) signal from an IMU sensor and wherein determining the target knee torque is further based on the IMU signal.

Clause 20. A powered knee and prosthetic leg system configured to provide volitional control to a user, the system comprising: a powered knee prosthesis including a powered knee joint configured to provide a knee torque; and a volitional controller, comprising: one or more processors; and one or more hardware storage devices having instructions stored thereon that are executable by the one or more processors to cause the volitional controller to at least: receive an electromyography (EMG) signal from a single EMG sensor source; receive a ground state signal from a ground reaction force (GRF) sensor; receive an inertial measurement unit (IMU) signal from an IMU sensor; determine a target knee torque based on the received EMG signal, ground state signal, and IMU signal; and output a knee torque signal for controlling the powered knee joint.

The invention claimed is:

1. A volitional controller for a powered knee prosthesis, comprising:
one or more processors; and
one or more hardware storage devices having instructions stored thereon that are executable by the one or more processors to cause the volitional controller to at least:
receive an electromyography (EMG) signal from a single EMG sensor source;
receive a ground state signal from a ground reaction force (GRF) sensor;
determine a target knee torque based on the received EMG signal and ground state signal; and
output a knee torque signal for controlling a powered knee joint of a powered knee prosthesis,
wherein the target knee torque comprises a flexion torque component and an extension torque component, wherein:
the flexion torque component comprises a flexion ground gain and a flexion thigh gain and wherein both the flexion ground gain and the flexion thigh gain are continuously variable between a lower threshold and an upper threshold; and/or the extension torque component comprises an extension ground gain and an extension knee gain and wherein both the extension ground gain and the extension knee gain are continuously variable between a lower threshold and an upper threshold.

2. The volitional controller of claim 1,
wherein when the ground state signal indicates that the prosthesis is off the ground, the EMG signal is mapped to a knee torque signal exhibiting flexion torque, and
wherein when the ground state signal indicates that the prosthesis is on the ground, the EMG signal is mapped to a knee torque signal exhibiting extension torque.

3. The volitional controller of claim 1, wherein transition of the knee torque signal between flexion torque and extension torque is continuous.

4. The volitional controller of claim 1, wherein the EMG sensor source is a biceps femoris muscle.

5. The volitional controller of claim 1, wherein the instructions further cause the volitional controller to receive an inertial measurement unit (IMU) signal from an IMU sensor.

6. The volitional controller of claim 5, wherein determining the target knee torque is further based on the IMU signal.

7. The volitional controller of claim 5, wherein the IMU signal is used to determine a thigh angle and/or a knee angle.

8. The volitional controller of claim 1, wherein determining the target knee torque further comprises one or more damping components.

9. A powered knee and prosthetic leg system configured to provide volitional control to a user, the system comprising:
a powered knee prosthesis; and
the controller of claim 1.

10. The powered knee and prosthetic leg system of claim 9, wherein the powered knee prosthesis comprises:
a pylon having a proximal and a distal end;
a prosthetic foot connected to the distal end of the pylon;
a powered knee joint connected to the proximal end of the pylon; and
a socket configured to receive a residual limb of a user, wherein the socket is connected to the powered knee joint.

11. The powered knee and prosthetic leg system of claim 10, wherein the powered knee prosthesis further comprises an EMG sensor, a GRF sensor, and an IMU sensor.

12. The powered knee and prosthetic leg system of claim 11, wherein the IMU sensor is disposed at or near a proximal end of the pylon.

13. The powered knee and prosthetic leg system of claim 9, wherein the powered knee and prosthetic leg system is configured to enable a user to ascend stairs in a forwards and backwards orientation.

14. A method for controlling a powered knee prosthesis, comprising:
receiving an EMG signal from a single EMG sensor source;
receiving a ground state signal from a ground reaction force (GRF) sensor;
determining a target knee torque based on the received EMG signal and ground state signal; and
outputting a knee torque signal for controlling a powered knee joint of a powered knee prosthesis, wherein determining the target knee torque comprises determining a flexion torque component and an extension torque component, wherein:
the flexion torque component comprises a flexion ground gain and a flexion thigh gain and wherein both the flexion ground gain and the flexion thigh gain are continuously variable between a lower threshold and an upper threshold; and/or
the extension torque component comprises an extension ground gain and an extension knee gain and wherein both the extension ground gain and the extension knee gain are continuously variable between a lower threshold and an upper threshold.

15. The method of claim 14,
wherein when the ground state signal indicates that the powered knee prosthesis is off the ground, the EMG signal is mapped to a knee torque signal exhibiting flexion torque, and
wherein when the ground state signal indicates that the powered knee prosthesis is on the ground, the EMG signal is mapped to a knee torque signal exhibiting extension torque.

16. The method of claim 14, further comprising receiving an inertial measurement unit (IMU) signal from an IMU sensor and wherein determining the target knee torque is further based on the IMU signal.

17. A powered knee and prosthetic leg system configured to provide volitional control to a user, the system comprising:
a powered knee prosthesis including a powered knee joint configured to provide a knee torque; and
a volitional controller, comprising:
one or more processors; and
one or more hardware storage devices having instructions stored thereon that are executable by the one or more processors to cause the volitional controller to at least:
receive an electromyography (EMG) signal from a single EMG sensor source;
receive a ground state signal from a ground reaction force (GRF) sensor;
receive an inertial measurement unit (IMU) signal from an IMU sensor;
determine a target knee torque based on the received EMG signal, ground state signal, and IMU signal; and
output a knee torque signal for controlling the powered knee joint,
wherein the target knee torque comprises a flexion torque component and an extension torque component, wherein:
the flexion torque component comprises a flexion ground gain and a flexion thigh gain and wherein both the flexion ground gain and the flexion thigh gain are continuously variable between a lower threshold and an upper threshold; and/or
the extension torque component comprises an extension ground gain and an extension knee gain and wherein both the extension ground gain and the extension knee gain are continuously variable between a lower threshold and an upper threshold.

\* \* \* \* \*